(12) United States Patent
Miller et al.

(10) Patent No.: US 12,221,980 B2
(45) Date of Patent: *Feb. 11, 2025

(54) GAS TURBINE ENGINE WITH VARIABLE PITCH INLET PRE-SWIRL FEATURES

(71) Applicant: General Electric Company, Schenectady, NY (US)

(72) Inventors: Brandon Wayne Miller, Liberty Township, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,584

(22) Filed: Oct. 5, 2023

(65) Prior Publication Data
US 2024/0026901 A1 Jan. 25, 2024

Related U.S. Application Data

(62) Division of application No. 17/686,673, filed on Mar. 4, 2022, now Pat. No. 11,808,281.

(51) Int. Cl.
*F04D 29/54* (2006.01)
*F04D 19/00* (2006.01)

(52) U.S. Cl.
CPC ......... *F04D 29/542* (2013.01); *F04D 19/002* (2013.01)

(58) Field of Classification Search
None
See application file for complete search history.

(56) References Cited

U.S. PATENT DOCUMENTS

| 2,634,581 A | 4/1953 | Kent |
| 2,663,993 A | 12/1953 | Mosser |
| 3,540,682 A | 11/1970 | Dibble et al. |
| 3,861,822 A | 1/1975 | Wanger |

(Continued)

FOREIGN PATENT DOCUMENTS

| CN | 101922312 A | 12/2010 |
| EP | 2615275 A1 | 7/2013 |

(Continued)

OTHER PUBLICATIONS

Willis, Quiet Clean Short-Haul Experimental Engine (QCSEE) Final Report, NASA-CR-159473, National Aeronautics and Space Administration, Contract NAS3-18021, QCSEE NAS Report NASA-CR-159473, Aug. 1979, 312 Pages.

*Primary Examiner* — Michael Lebentritt
(74) *Attorney, Agent, or Firm* — Dority & Manning, P.A.

(57) ABSTRACT

A gas turbine engine includes a fan having a plurality of fan blades, a turbomachine operably coupled to the fan for driving the fan, the turbomachine including a compressor section, a combustion section, and a turbine section in serial flow order and together defining a core air flowpath, a nacelle surrounding and at least partially enclosing the fan, the nacelle defining a longitudinal axis, and an inlet pre-swirl feature located upstream of the plurality of fan blades, the inlet pre-swirl feature attached to or integrated into the nacelle, wherein the inlet pre-swirl feature is transitionable between a first angle with respect to the longitudinal axis of the nacelle and a second angle with respect to the longitudinal axis of the nacelle.

19 Claims, 9 Drawing Sheets

(56) References Cited

U.S. PATENT DOCUMENTS

| | | | |
|---|---|---|---|
| 3,981,466 A | 9/1976 | Shah | |
| 4,688,745 A | 8/1987 | Rosenthal | |
| 5,010,729 A | 4/1991 | Adamson et al. | |
| 7,055,304 B2 | 6/2006 | Courtot et al. | |
| 7,246,773 B2 | 7/2007 | Stoner et al. | |
| 7,374,404 B2 | 5/2008 | Schilling | |
| 7,789,620 B2 | 9/2010 | Vontell, Sr. et al. | |
| 7,882,694 B2 | 2/2011 | Suciu et al. | |
| 7,926,261 B2 | 4/2011 | Porte | |
| 8,366,047 B2 * | 2/2013 | Euvino, Jr. | F01D 25/02 |
| | | | 60/39.093 |
| 8,397,487 B2 | 3/2013 | Sennoun et al. | |
| 8,529,188 B2 | 9/2013 | Winter | |
| 8,677,764 B2 | 3/2014 | Porte | |
| 8,689,538 B2 | 4/2014 | Sankrithi et al. | |
| 8,943,796 B2 | 2/2015 | McCaffrey | |
| 9,045,991 B2 | 6/2015 | Read et al. | |
| 9,109,514 B2 | 8/2015 | Cheong | |
| 9,114,877 B2 | 8/2015 | Weber et al. | |
| 9,239,005 B2 | 1/2016 | Strecker et al. | |
| 9,540,094 B2 | 1/2017 | Negulescu et al. | |
| 9,695,751 B2 | 7/2017 | Kupratis et al. | |
| 9,874,109 B2 | 1/2018 | Hatcher, Jr. et al. | |
| 9,879,599 B2 | 1/2018 | Mercier et al. | |
| 9,945,247 B2 | 4/2018 | Appukuttan et al. | |
| 9,995,167 B2 | 6/2018 | Shepard | |
| 10,054,052 B2 | 8/2018 | Zheng et al. | |
| 10,100,733 B2 | 10/2018 | O'Toole et al. | |
| 10,113,444 B2 | 10/2018 | Huang et al. | |
| 10,145,301 B2 | 12/2018 | Abrari et al. | |
| 10,173,780 B2 | 1/2019 | Mackin et al. | |
| 10,184,340 B2 | 1/2019 | Baltas et al. | |
| 10,189,572 B2 | 1/2019 | Mackin et al. | |
| 10,239,626 B2 | 3/2019 | Herchenroder et al. | |
| 10,240,526 B2 | 3/2019 | Suciu et al. | |
| 10,288,010 B2 | 5/2019 | Houston et al. | |
| 10,288,083 B2 | 5/2019 | Miller et al. | |
| 10,344,711 B2 | 7/2019 | Hsu | |
| 10,378,554 B2 | 8/2019 | Yu et al. | |
| 10,399,664 B2 | 9/2019 | Bowden et al. | |
| 10,557,415 B2 | 2/2020 | Boudebiza et al. | |
| 10,563,513 B2 | 2/2020 | Kalitzin et al. | |
| 10,690,146 B2 | 6/2020 | Urac et al. | |
| 10,711,797 B2 | 7/2020 | Kroger et al. | |
| 10,724,435 B2 | 7/2020 | Kroger et al. | |
| 10,794,292 B2 | 10/2020 | Kupratis et al. | |
| 10,794,395 B2 | 10/2020 | Tamada | |
| 10,794,396 B2 | 10/2020 | Kroger et al. | |
| 10,801,442 B2 | 10/2020 | Clements et al. | |
| 10,815,886 B2 | 10/2020 | Kroger et al. | |
| 10,822,999 B2 | 11/2020 | Morris et al. | |
| 10,823,114 B2 | 11/2020 | Clements et al. | |
| 10,837,361 B2 | 11/2020 | Abrari et al. | |
| 11,073,090 B2 * | 7/2021 | Nestico | F02C 7/047 |
| 11,118,601 B2 | 9/2021 | Yu et al. | |
| 2001/0023582 A1 | 9/2001 | Nagel | |
| 2009/0277181 A1 | 11/2009 | Druon et al. | |
| 2012/0240594 A1 | 9/2012 | Shamara | |
| 2012/0241561 A1 | 9/2012 | Shamara | |
| 2013/0192263 A1 | 8/2013 | Suciu et al. | |
| 2014/0208768 A1 | 7/2014 | Bacic | |
| 2016/0017751 A1 | 1/2016 | Caruel | |
| 2016/0195010 A1 | 7/2016 | Roberge | |
| 2018/0363554 A1 | 12/2018 | Kroger et al. | |
| 2018/0363675 A1 | 12/2018 | Kroger et al. | |
| 2018/0363676 A1 | 12/2018 | Kroger et al. | |
| 2018/0363677 A1 | 12/2018 | Kroger et al. | |
| 2018/0363678 A1 | 12/2018 | Kroger et al. | |
| 2019/0107119 A1 | 4/2019 | Yu et al. | |
| 2019/0226402 A1 | 7/2019 | Kray et al. | |
| 2020/0049077 A1 | 2/2020 | Schwarz et al. | |
| 2020/0149421 A1 | 5/2020 | Lad | |
| 2021/0078715 A1 | 3/2021 | Bevirt et al. | |
| 2021/0108597 A1 | 4/2021 | Ostdiek et al. | |

FOREIGN PATENT DOCUMENTS

| | | |
|---|---|---|
| FR | 1038694 A | 9/1953 |
| GB | 2403778 A | 1/2005 |
| WO | WO2016/016632 A1 | 2/2016 |

* cited by examiner

GAS TURBINE ENGINE WITH VARIABLE PITCH INLET PRE-SWIRL FEATURES

CROSS-REFERENCE TO RELATED APPLICATIONS

This application is a Divisional Application of U.S. application Ser. No. 17/686,673 filed Mar. 4, 2022, which is hereby incorporated by reference in its entirety.

TECHNICAL FIELD

The present subject matter relates generally to a gas turbine engine, or more particularly to a gas turbine engine configured to guide an airflow at an inlet of a nacelle.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until the compressed air reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

However, efficiency losses in the fan may result in a less efficient turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
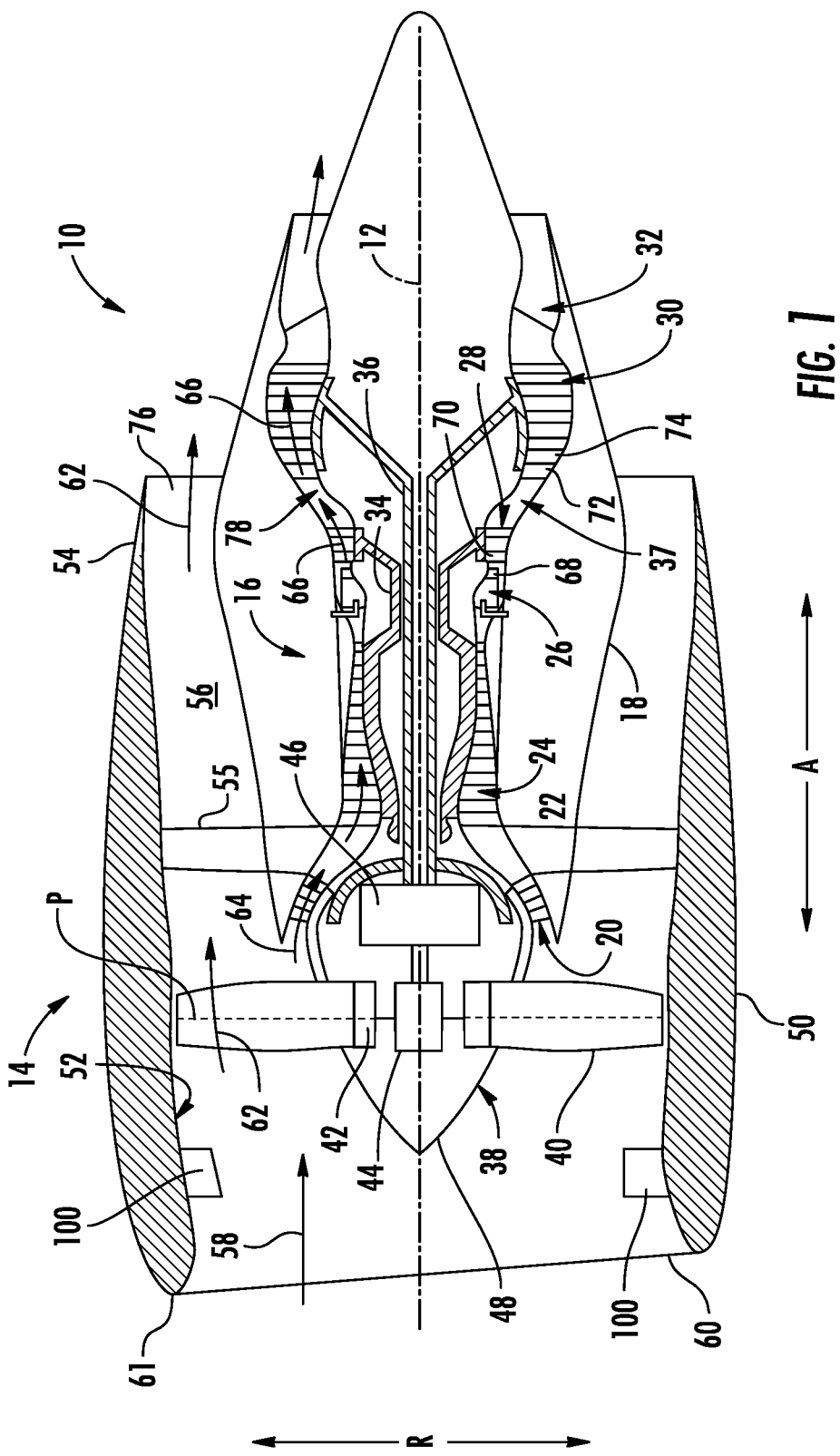
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and to use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. The specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refers to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fan pressure ratio" refers to a ratio of an air pressure immediately downstream of the fan blades of a fan during operation of the fan to an air pressure immediately upstream of the fan blades of the fan during operation of the fan.

As used herein, the term "rated speed" with reference to a turbofan engine refers to a maximum rotational speed that the turbofan engine may achieve while operating properly. For example, the turbofan engine may be operating at the rated speed during maximum load operations, such as during takeoff operations.

Also as used herein, the term "fan tip speed" as defined by the plurality of fan blades of the fan refers to a linear speed of an outer tip of a fan blade along a radial direction during operation of the fan.

The present disclosure generally relates to an inlet pre-swirl feature configured as a plurality of part span inlet guide vanes for a gas turbine engine and a control system in communication with components of the gas turbine engine.

Each of the part span inlet guide vanes of the present disclosure is transitionable between a first angle with respect to a longitudinal axis of an outer nacelle and a second angle with respect to the longitudinal axis of the outer nacelle, wherein the first angle and the second angle are different. In other words, an angle of the part span inlet guide vanes of the present disclosure can be varied during operation of the gas turbine engine.

The angle of the part span inlet guide vanes is variable in order to match the swirl imparted to the incoming air to the airspeed of the aircraft and the rotational speed of the fan such that the angular velocity of the air as it approaches the fan blade corresponds as closely as possible with the angular velocity of the fan blade. This minimizes the potential of the fan to surge/stall. The faster the fan rotates, the more swirl that needs to be imparted by the part span inlet guide vanes. As the airspeed of the aircraft increases, the time that it takes for the incoming air to pass from the part span inlet guide vanes to the leading edge of the fan decreases, and as such the necessary amount of swirl decreases proportionately. As such the maximum imparted swirl is required when the engine is at maximum thrust with a stationary aircraft, just prior to beginning a takeoff roll.

The control system of the present disclosure is in communication with a variable pitch mechanism, a compensation air supply assembly, a blade passing sensor, a crosswind sensor, and an electrical system of the gas turbine engine. For example, the control system of the present disclosure may be used to determine when to transition or to change an angle of the inlet pre-swirl feature, e.g., configured as the plurality of part span inlet guide vanes, with respect to the longitudinal axis of the outer nacelle. Furthermore, the control system of the present disclosure may be used to determine when to modulate a high pressure airflow through a trailing edge opening of the inlet pre-swirl feature during operation of the gas turbine engine. Furthermore, the control system may be used to determine when to start the electrical system of the present disclosure to provide power to the electrical heating elements.

Based on the design of a specific engine, there may be known operating points at which flutter occurs. A control system of the present disclosure can be provided with operating condition maps and control the airflow through the part span inlet guide vanes to mitigate the flutter when it is anticipated to occur. Flutter can also be detected using vibration or pressure sensors in the control system, to determine that flutter is currently occurring, and adjust the airflow through the part span inlet guide vanes to mitigate the flutter. The presence of flutter would result in a ripple on the vibration or pressure sensor output. A control system of the present disclosure can also determine the air temperature of the environment in which the engine is operating and turn on the anti-ice features described herein when conditions indicate a potential for ice formation.

The plurality of part span inlet guide vanes are also configured to pre-swirl an airflow provided through an inlet of the outer nacelle, upstream of the plurality of fan blades of the fan. As discussed herein, pre-swirling the airflow provided through the inlet of the outer nacelle prior to such airflow reaching the plurality of fan blades of the fan may reduce separation losses and/or shock losses, allowing the fan to operate with relatively high fan tip speeds with less losses in efficiency.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or a tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

During operation of the turbofan engine 10, the fan 38 defines a fan pressure ratio and the plurality of fan blades 40 each defines a fan tip speed. The exemplary turbofan engine 10 depicted defines a relatively high fan tip speed and relatively low fan pressure ratio during operation of the turbofan engine at a rated speed. As used herein, the term "fan pressure ratio" refers to a ratio of an air pressure immediately downstream of the fan blades 40 during operation of the fan 38 to an air pressure immediately upstream of the fan blades 40 during operation of the fan 38. For the embodiment depicted in FIG. 1, the fan 38 of the turbofan engine 10 defines a relatively low fan pressure ratio. For example, the turbofan engine 10 depicted defines a fan pressure ratio less than or equal to about 1.5. For example, in certain exemplary embodiments, the turbofan engine 10 may define a fan pressure ratio less than or equal to about 1.4. In certain exemplary embodiments, it is contemplated that the turbofan engine 10 may define other fan pressure ratios for a particular application. The fan pressure ratio may be the fan pressure ratio of the fan 38 during operation of the turbofan engine 10, such as during operation of the turbofan engine 10 at a rated speed.

As used herein, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations.

Also as used herein, the term "fan tip speed" defined by the plurality of fan blades 40 refers to a linear speed of an outer tip of a fan blade 40 along the radial direction R during operation of the fan 38. In exemplary embodiments, the turbofan engine 10 of the present disclosure causes the fan blades 40 of the fan 38 to rotate at a relatively high rotational speed. For example, during operation of the turbofan engine 10 at the rated speed, the fan tip speed of each of the plurality of fan blades 40 is greater than or equal to 1000 feet per second and less than or equal to 2250 feet per second. In certain exemplary embodiments, during operation of the turbofan engine 10 at the rated speed, the fan tip speed of each of the fan blades 40 may be greater than or equal to 1,250 feet per second and less than or equal to 2250 feet per second. In certain exemplary embodiments, during operation of the turbofan engine 10 at the rated speed, the fan tip speed of each of the fan blades 40 may be greater than or equal to about 1,350 feet per second, such as greater than about 1,450 feet per second, such as greater than about 1,550 feet per second, and less than or equal to 2250 feet per second. In certain exemplary embodiments, it is contemplated that during operation of the turbofan engine 10 at the rated speed, the fan tip speed of each of the fan blades 40 may define other ranges for a particular application.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass airflow passage 56 (i.e., the first portion of air indicated by arrows 62) to an amount of airflow through the core air flowpath 37 (i.e., the second portion of air indicated by arrows 64) is known as a bypass ratio.

In exemplary embodiments, the bypass ratio during operation of the turbofan engine 10 (e.g., at a rated speed) is less than or equal to about eleven (11). For example, the bypass ratio during operation of the turbofan engine 10 (e.g., at a rated speed) may be less than or equal to about ten (10), such as less than or equal to about nine (9). Additionally, the bypass ratio may be at least about two (2).

In other exemplary embodiments, the bypass ratio may generally be between about 7:1 and about 20:1, such as between about 10:1 and about 18:1. In certain exemplary embodiments, it is contemplated that the bypass ratio may generally be between other ranges for a particular application. The pressure of the second portion of air indicated by arrows 64 is then increased as it is routed through the high pressure (HP) compressor 24 and into the combustion section 26, where it is mixed with fuel and burned to provide combustion gases 66.

In exemplary embodiments, a gear ratio of the power gear box 46 is greater than or equal to 1.2 and less than or equal to 3.0. In some exemplary embodiments, the gear ratio of the power gear box 46 is greater than or equal to 1.2 and less than or equal to 2.6. In other exemplary embodiments, the gear ratio of the power gear box 46 is greater than or equal to 1.2 and less than or equal to 2.0. In certain exemplary embodiments, it is contemplated that the gear ratio of the power gear box 46 is between other ranges for a particular application.

Referring still to FIG. 1, the compressed second portion of air indicated by arrows 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air indicated by arrows 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Referring still to FIG. 1, the turbofan engine 10 of the present disclosure also provides pre-swirling flow forward of a tip of the fan blade 40 as described herein. For example, the turbofan engine 10 additionally includes an inlet pre-swirl feature, e.g., configured as a plurality of part span inlet guide vanes 100, as described in greater detail herein.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust, and up to, e.g., about 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., power gearbox 46) driving the fan, may include any other suitable number or arrangement of shafts, spools, compressors, turbines, etc.

Figure 2:
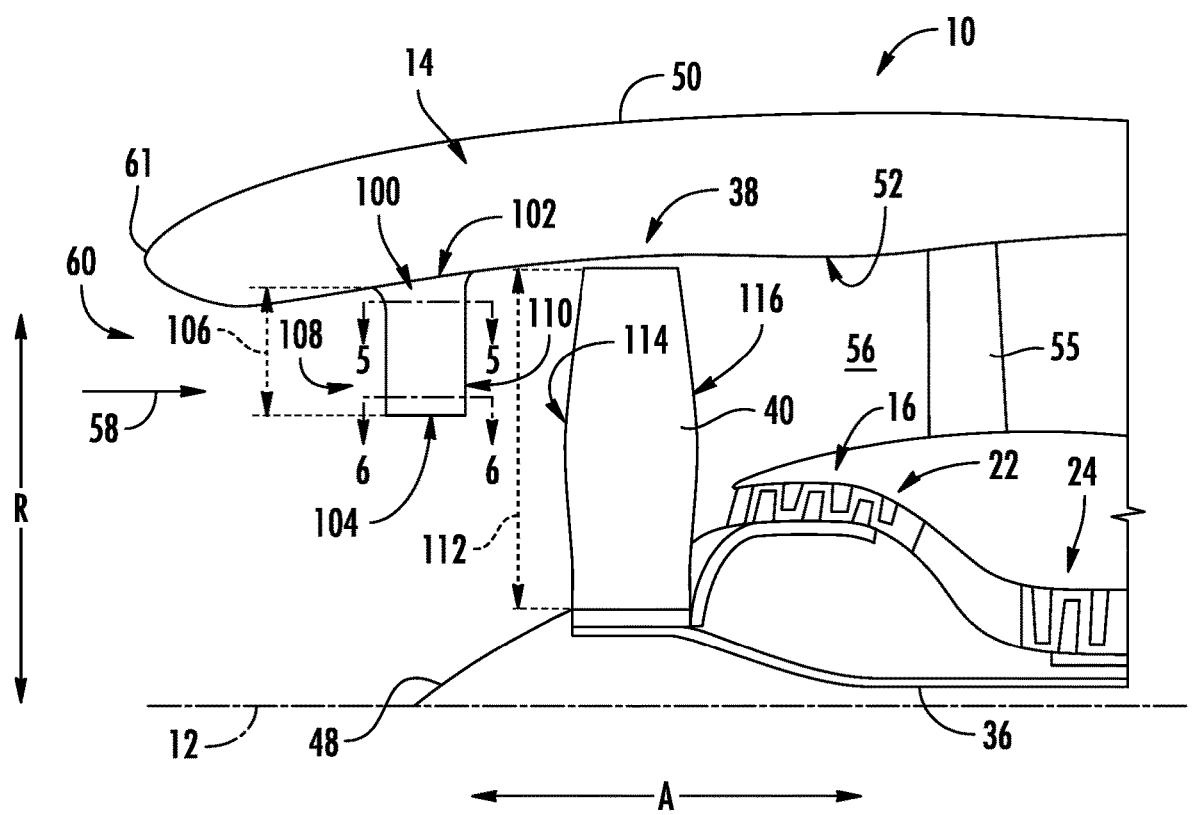
FIG. 2 is a close-up, schematic view of a forward end of the exemplary gas turbine engine of FIG. 1 according to an exemplary embodiment of the present subject matter.

As discussed above, the turbofan engine 10 of the present disclosure also provides pre-swirling flow forward a tip of the fan blade 40. Referring now also to FIG. 2, a close-up, schematic view of the fan section 14 and forward end of the turbomachine 16 of the exemplary turbofan engine 10 of FIG. 1 is provided. In exemplary embodiments, the turbofan engine 10 includes an inlet pre-swirl feature located upstream of the plurality of fan blades 40 of the fan 38 and attached to or integrated into the outer nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from the outer nacelle 50 (such as from the inner wall 52 of the outer nacelle 50) at a location forward of the plurality of fan blades 40 of the fan 38 along the axial direction A and aft of the inlet 60 of the outer nacelle 50. More specifically, each of the plurality of part span inlet guide vanes 100 defines an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 102, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 is unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, as depicted, each of the plurality of part span inlet guide vanes 100 does not extend completely between the outer nacelle 50 and, e.g., the hub 48 of the turbofan engine 10. More specifically, for the embodiment depicted, each of the plurality of inlet guide vane defines an inlet guide vane ("IGV") span 106 along the radial direction R, and further each of the plurality of part span inlet guide vanes 100 also defines a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, the plurality of fan blades 40 of the fan 38 define a fan blade span 112 along the radial direction R. More specifically, each of the plurality of fan blades 40 of the fan 38 also defines a leading edge 114 and a trailing edge 116, and the fan blade span 112 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
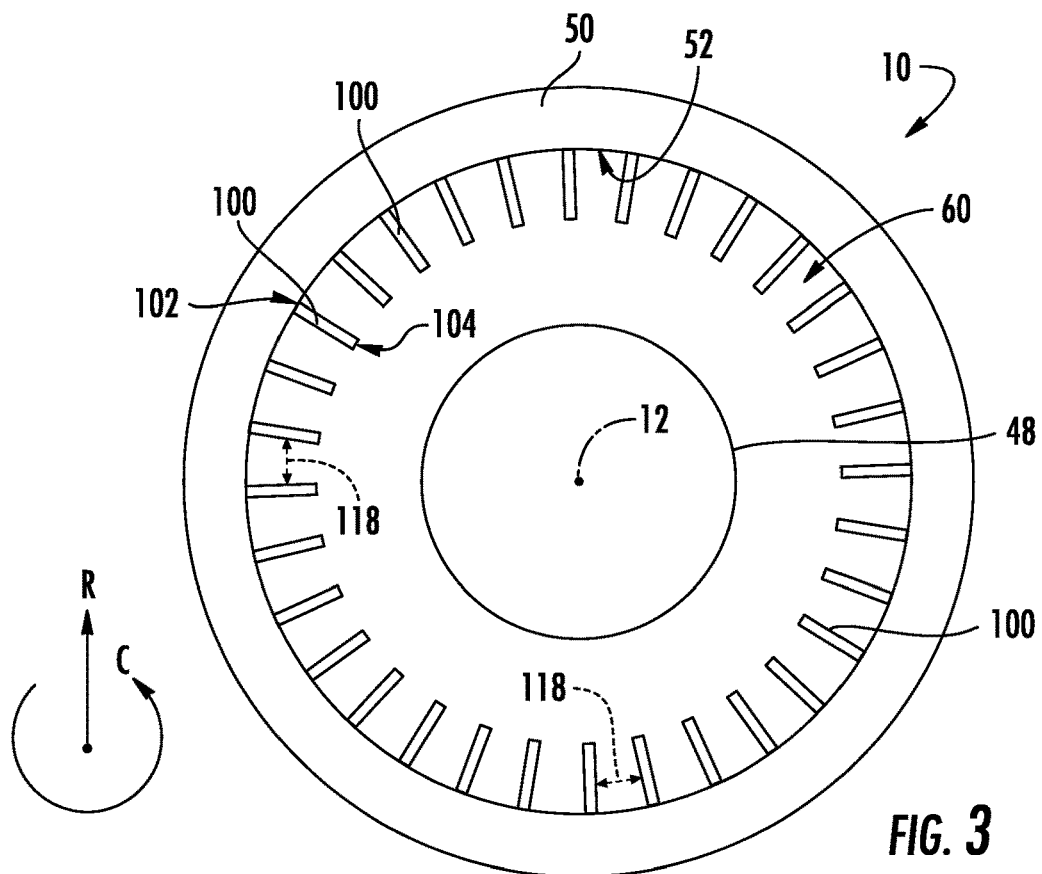
FIG. 3 is a schematic view of an inlet to the exemplary gas turbine engine of FIG. 1, along an axial direction of the gas turbine engine of FIG. 1 according to an exemplary embodiment of the present subject matter.

Reference will now also be made to FIG. 3, providing an axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about ten part span inlet guide vanes 100 and about fifty part span inlet guide vanes 100. More specifically, for the embodiment depicted, the plurality of part span inlet guide vanes 100 includes between about twenty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 is spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
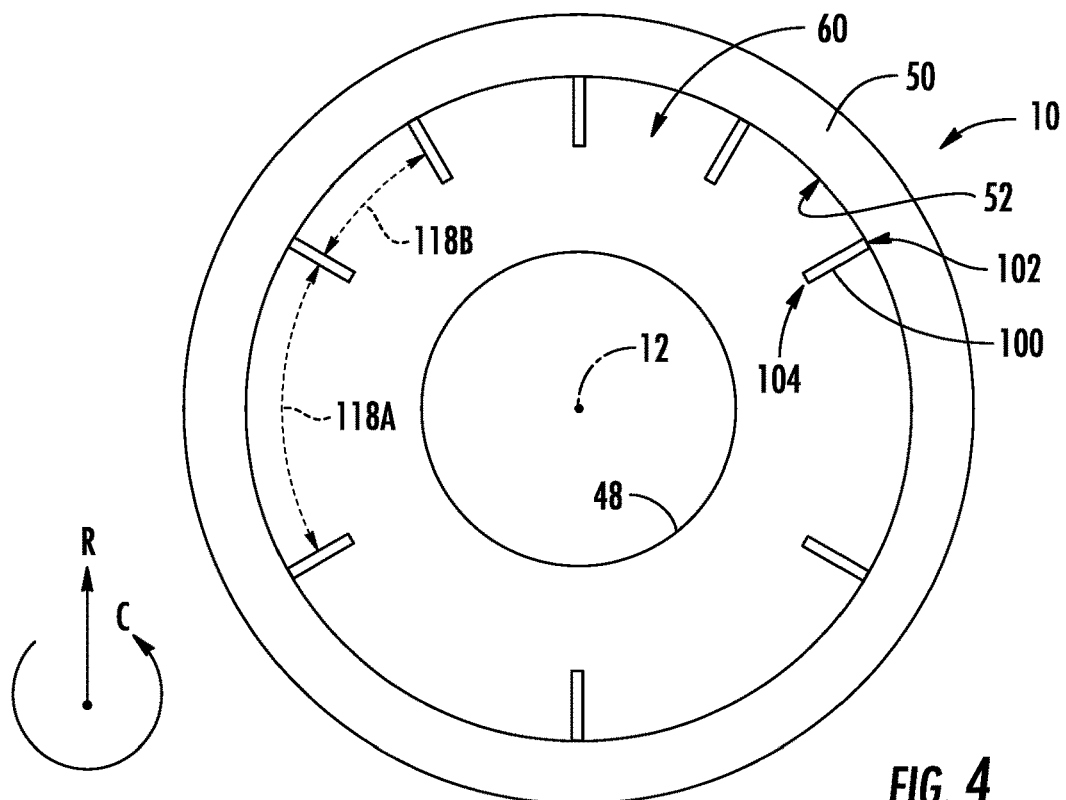
FIG. 4 is a schematic view of an inlet to a gas turbine engine in accordance with another exemplary embodiment of the present disclosure.

Further, it should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 defines a first circumferential spacing 118A, while other of the plurality of part span inlet guide vanes 100 defines a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, the circumferential spacing 118 refers to a mean circumferential spacing between adjacent part span inlet guide vanes 100. The non-uniform circumferential spacing may, e.g., offset structure upstream of the part span inlet guide vanes 100.

Referring now back to FIGS. 2 and 3, each of the plurality of part span inlet guide vanes 100 is configured to pre-swirl an airflow 58 (FIG. 1) provided through the inlet 60 of the outer nacelle 50, upstream of the plurality of fan blades 40 of the fan 38. As discussed herein, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency.

Figure 5:
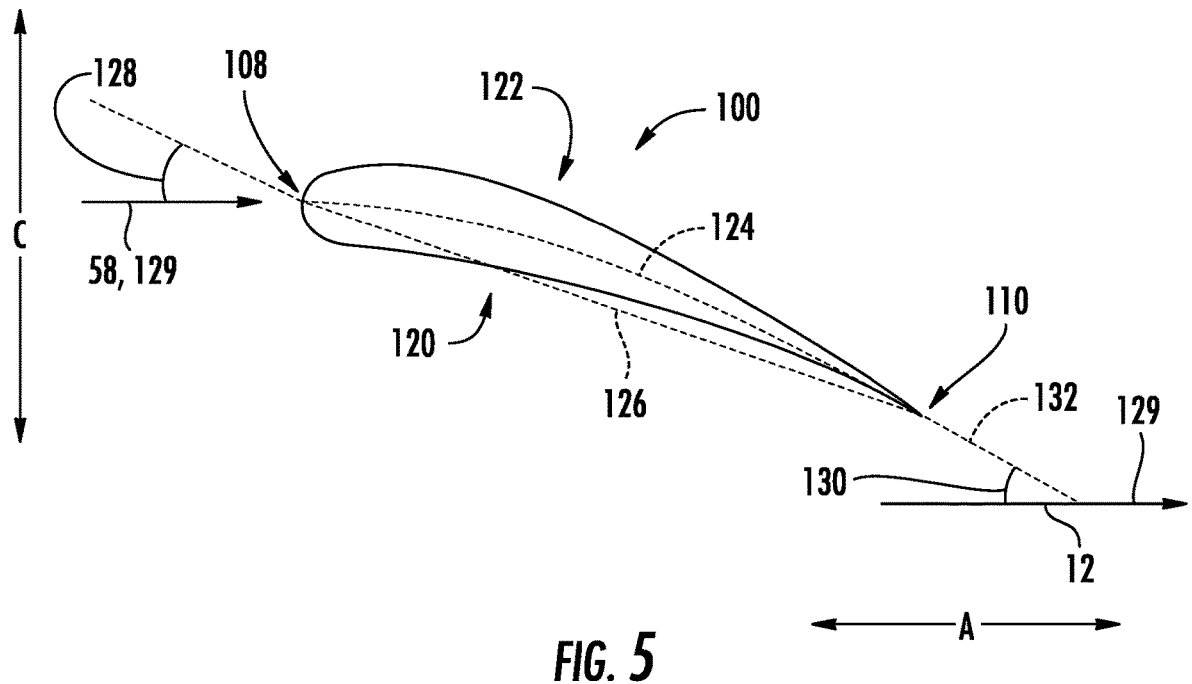
FIG. 5 is a cross-sectional view of a part span inlet guide vane of the exemplary gas turbine engine of FIG. 1 at a first location along a span of the part span inlet guide vane in accordance with an exemplary embodiment of the present disclosure.

For example, referring first to FIG. 5, a cross-sectional view of one part span inlet guide vane 100 along the span of the part span inlet guide vanes 100, as indicated by Line 5-5 in FIG. 2, is provided. As is depicted, the part span inlet guide vane 100 is configured generally as an airfoil having a pressure side 120 and an opposite suction side 122, and extending between the leading edge 108 and the trailing edge 110 along a camber line 124. Additionally, the part span inlet guide vane 100 defines a chord line 126 extending directly from the leading edge 108 to the trailing edge 110. The chord line 126 of the part span inlet guide vane 100 defines an angle of attack 128 with respect to the longitudinal axis 12 of the outer nacelle 50 (FIG. 2). For example, the chord line 126 defines an angle of attack 128 with an airflow direction 129 of the airflow 58 through the inlet 60 of the nacelle 50. Notably, for the embodiment depicted, the airflow direction 129 is substantially parallel to the axial direction A and the longitudinal axis 12 of the outer nacelle 50 of the turbofan engine 10. For the embodiment depicted, the angle of attack 128 at the location depicted along the span 106 of the part span inlet guide vanes 100 is at least approximately five degrees and up to approximately thirty-five degrees. For example, in certain embodiments, the angle of attack 128 at the location depicted along the span 106 of the part span inlet guide vane 100 may be between about ten degrees and about thirty degrees, such as between about fifteen degrees and about twenty-five degrees.

Additionally, the part span inlet guide vane 100, at the location depicted along the span 106 of the part span inlet guide vane 100 defines a local swirl angle 130 at the trailing edge 110. The "swirl angle" at the trailing edge 110 of the part span inlet guide vane 100, as used herein, refers to an angle between the airflow direction 129 of the airflow 58 through the inlet 60 of the nacelle 50 and a reference line 132 defined by a trailing edge section of the pressure side 120 of the part span inlet guide vane 100. More specifically, the reference line 132 is defined by the aft twenty percent of the pressure side 120, as measured along the chord line 126. Notably, when the aft twenty percent the pressure side 120 defines a curve, the reference line 132 may be straight-line average fit of such curve (e.g., using least mean squares).

Further, a maximum swirl angle 130 refers to the highest swirl angle 130 along the span 106 of the part span inlet guide vane 100. For the embodiment depicted, the maximum swirl angle 130 is defined proximate the radially outer end 102 of the part span inlet guide vane 100 (e.g., at the outer ten percent of the span 106 of the part span inlet guide vanes 100), as is represented by the cross-sectional view depicted in FIG. 5. For the embodiment depicted, the maximum swirl angle 130 of each part span inlet guide vane 100 at the trailing edge 110 is between approximately five degrees and approximately thirty-five degrees. For example, in certain exemplary embodiments, the maximum swirl angle 130 of each part span inlet guide vane 100 at the trailing edge 110 may be between twelve degrees and twenty-five degrees.

Figure 6:
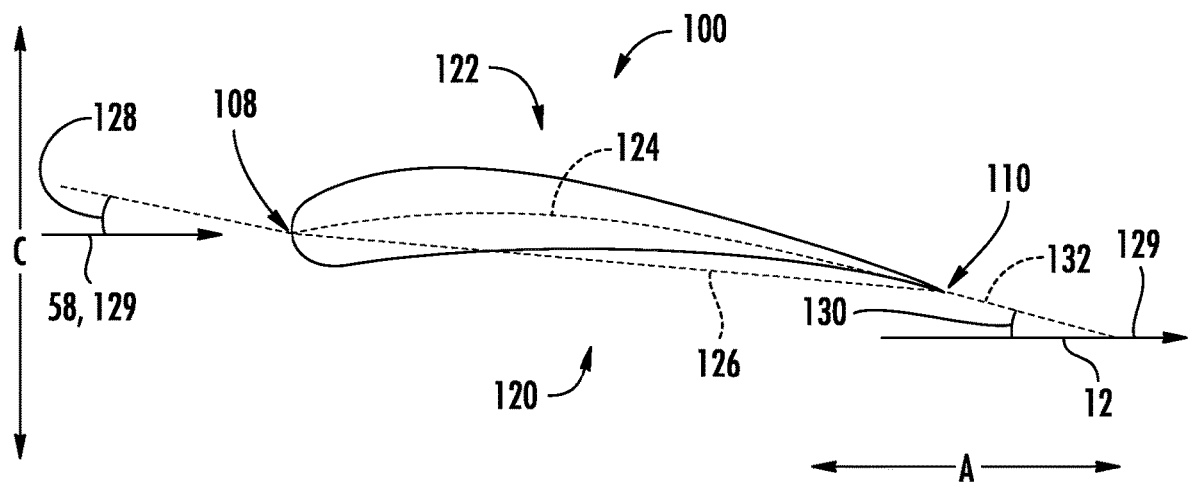
FIG. 6 is a cross-sectional view of the part span inlet guide vane of the exemplary gas turbine engine of FIG. 1 at a second location along the span of the part span inlet guide vane in accordance with an exemplary embodiment of the present disclosure.

Moreover, for the embodiment of FIG. 2, the local swirl angle 130 increases from the radially inner end 104 to the radially outer end 102 of each part span inlet guide vane 100. For example, referring now also to FIG. 6, a cross-sectional view of a part span inlet guide vane 100 at a location radially inward from the cross-sectional view in FIG. 5, as indicated by Line 6-6 in FIG. 2, is provided. As is depicted in FIG. 6, and as stated above, the part span inlet guide vane 100 defines the pressure side 120, the suction side 122, the leading edge 108, the trailing edge 110, the camber line 124, and the chord line 126. Further, the angle of attack 128 defined by the chord line 126 and the airflow direction 129 of the airflow 58 through the inlet 60 of the nacelle 50 at the location along the span 106 depicted in FIG. 6 is less than the angle of attack 128 at the location along the span 106 depicted in FIG. 5 (e.g., may be at least about twenty percent less, such as at least about fifty percent less, such as up to about one hundred percent less). Additionally, the part span inlet guide vane 100 defines a local swirl angle 130 at the trailing edge 110 at the location along the span 106 of the part span inlet guide vane 100 proximate the inner end 104, as depicted in FIG. 6. As stated above, the local swirl angle 130 increases from the radially inner end 104 to the radially outer end 102 of each part span inlet guide vanes 100. Accordingly, the local swirl angle 130 proximate the outer end 102 (see FIG. 5) is greater than the local swirl angle 130 proximate the radially inner end 104 (see FIG. 6; e.g., the radially inner ten percent of the span 106). For example, the local swirl angle 130 may approach zero degrees (e.g., may be less than about five degrees, such as less than about two degrees) at the radially inner end 104.

Notably, including part span inlet guide vanes 100 of such a configuration may reduce an amount of turbulence at the radially inner end 104 of each respective part span inlet guide vane 100. Additionally, such a configuration may provide a desired amount of pre-swirl at the radially outer ends of the plurality of fan blades 40 of the fan 38 (where the speed of the fan blades 40 is the greatest) to provide a desired reduction in flow separation and/or shock losses that may otherwise occur due to a relatively high speed of the plurality of fan blades 40 at the fan tips during operation of the turbofan engine 10.

Each of the part span inlet guide vanes 100 of the present disclosure is transitionable between a first angle, e.g., an angle of attack 128 or a local swirl angle 130, with respect to the longitudinal axis 12 of the outer nacelle 50 and a second angle, e.g., an angle of attack 128 or a local swirl angle 130, with respect to the longitudinal axis 12 of the outer nacelle 50, wherein the first angle and the second angle are different. In other words, an angle of the part span inlet guide vanes 100 of the present disclosure can be varied during operation of the turbofan engine 10. In exemplary embodiments, it is contemplated that the second angle is at least about 2% greater/less than the first angle. In other exemplary embodiments, it is contemplated that the second angle is at least about 5% greater/less than the first angle. In other exemplary embodiments, it is contemplated that the second angle is at least about 10% greater/less than the first angle.

In the present disclosure, the angle of the part span inlet guide vanes 100 is variable in order to match the swirl imparted to the incoming air to the airspeed of the aircraft and the rotational speed of the fan 38 such that the angular velocity of the air as it approaches the fan blade 40 corresponds as closely as possible with the angular velocity of the fan blade 40. This minimizes the potential of the fan 38 to surge/stall. The faster the fan 38 rotates, the more swirl that needs to be imparted by the part span inlet guide vanes 100. As the airspeed of the aircraft increases, the time that it takes for the incoming air to pass from the part span inlet guide vanes 100 to the leading edge 114 of the fan 38 decreases, and as such the necessary amount of swirl decreases proportionately. As such the maximum imparted swirl is required when the engine 10 is at maximum thrust with a stationary aircraft, just prior to beginning a takeoff roll.

For example, each of the part span inlet guide vanes 100 of the present disclosure could transition from a higher angle (FIG. 5) to a lower angle (FIG. 6) during operation of the turbofan engine 10. Furthermore, each of the part span inlet guide vanes 100 of the present disclosure could transition from a lower angle (FIG. 5) to a higher angle (FIG. 6) during operation of the turbofan engine 10.

Figure 7:
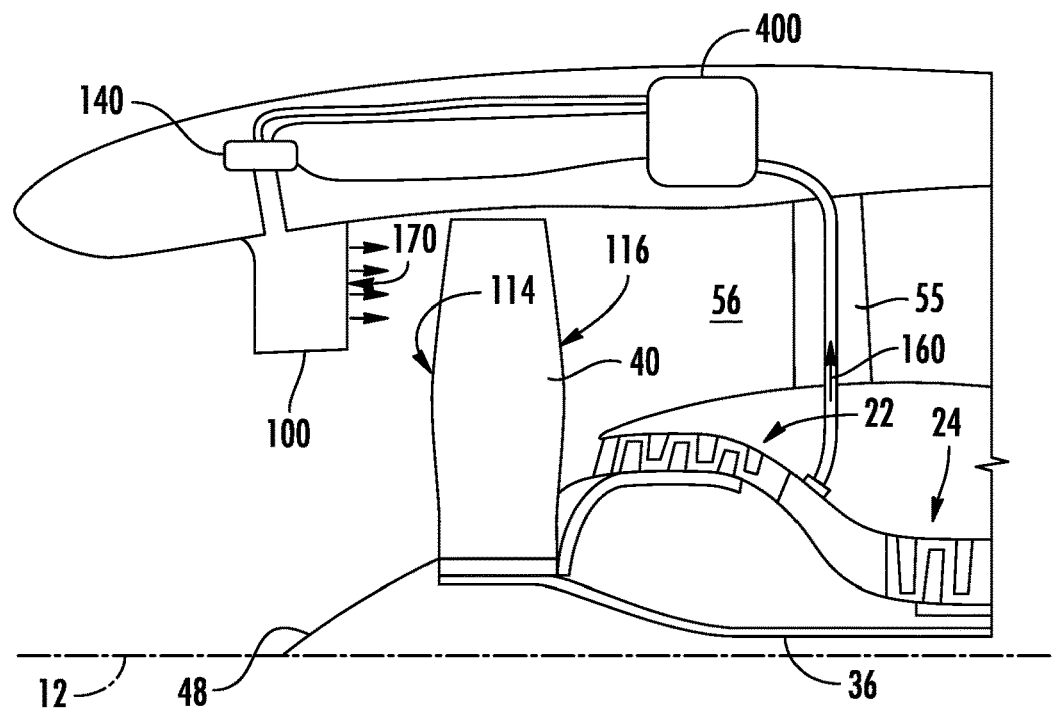
FIG. 7 is a schematic view of an exemplary gas turbine engine according to another exemplary embodiment of the present subject matter.

Referring now to FIG. 7, a close-up, schematic view of the fan section 14 and forward end of the turbomachine 16 of the exemplary turbofan engine 10 of FIG. 1 according to exemplary embodiments is provided. In exemplary embodiments, the turbofan engine 10 includes a variable pitch mechanism 140 that is in communication with the inlet pre-swirl feature, e.g., configured as the plurality of part span inlet guide vanes 100. The variable pitch mechanism 140 is configured to transition the inlet pre-swirl feature, e.g., configured as the plurality of part span inlet guide vanes 100, between the first angle (for example, FIG. 5) with respect to the longitudinal axis 12 of the outer nacelle 50 and the second angle (for example, FIG. 6) with respect to the longitudinal axis 12 of the outer nacelle 50. It is contemplated that the variable pitch mechanism 140 may include, for example, a stepper motor, a torque motor, or similar drive component.

Figure 8:
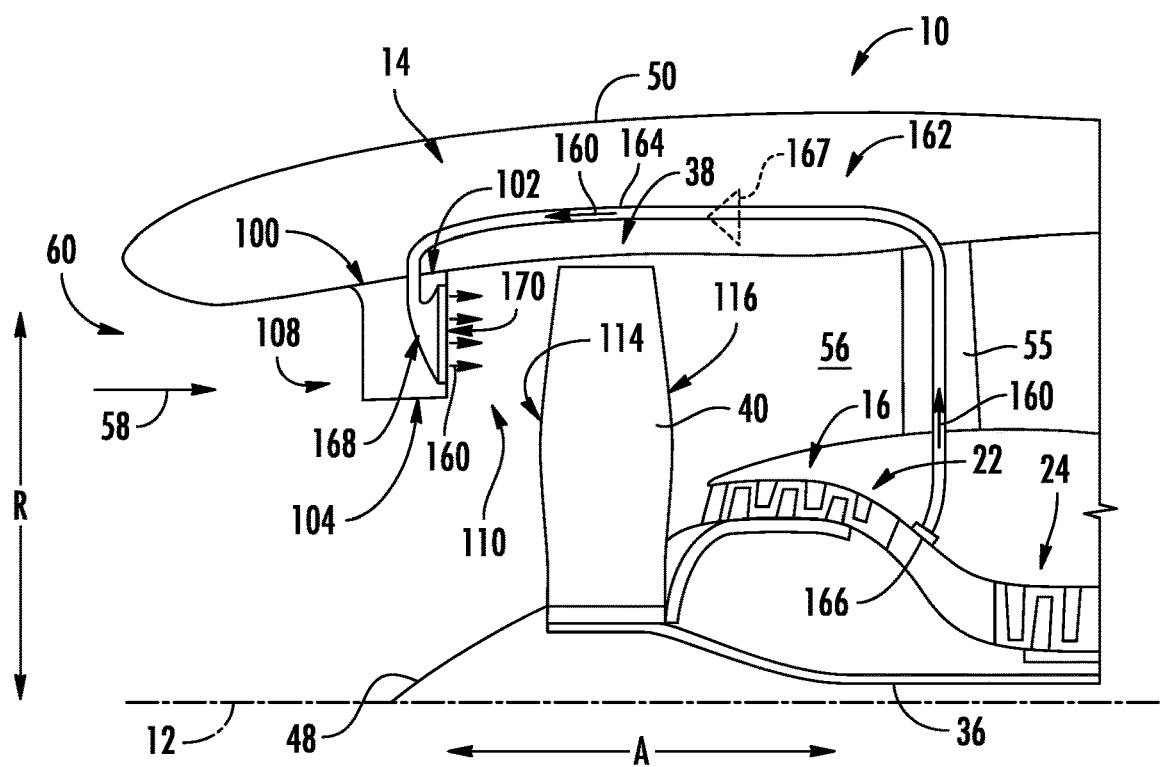
FIG. 8 is a schematic view of an exemplary gas turbine engine according to another exemplary embodiment of the present subject matter.

Referring now also to FIG. 8, a close-up, schematic view of the fan section 14 and forward end of the turbomachine 16 of the exemplary turbofan engine 10 of FIG. 1 according to exemplary embodiments is provided. In exemplary embodiments, the plurality of part span inlet guide vanes 100 for the embodiment depicted are further configured to provide a compensation airflow 160 to a trailing edge 110 of the plurality of part span inlet guide vanes 100 to minimize a wake of the part span inlet guide vanes 100. More specifically, for the embodiment of FIG. 8, the turbofan engine 10 further includes a compensation air supply assembly 162 in airflow communication with a high pressure air source. The compensation air supply assembly 162 generally includes a compensation air supply duct 164 defining an inlet 166 in airflow communication with the high pressure air source, which for the embodiment depicted is the compressor section 22, 24 of the turbofan engine 10. For example, the compensation air supply duct 164 may be configured to receive bleed air from the compressor section 22, 24 of the turbofan engine 10. Notably, however, in other embodiments, the compensation air supply duct 164 may instead receive high pressure air from any other suitable high pressure air source. For example, in other exemplary embodiments, the high pressure air source may instead be the bypass airflow duct 56 at a location downstream of the plurality of fan blades 40 of the fan 38. Additionally, in one or more these embodiments, the compensation air supply assembly 162 may further include an air compressor 167 (depicted in phantom) configured to increase a pressure of the compensation airflow 160 through the compensation air supply duct 164. Notably, although the supply duct 164 is depicted as a single, continuous, and separate supply duct 164, in other embodiments, the composition air supply duct 164 may have any other suitable configuration. For example, the duct 164 may be formed of a plurality of sequential ducts, may be formed integrally with other components of the turbofan engine 10, and/or may be split off into a plurality of parallel airflow ducts to provide compensation airflow 160 to each of the plurality of part span inlet guide vanes 100.

Further, the compensation air supply duct 164 extends through at least one of the plurality of part span inlet guide vanes 100, and provides a cavity 168 of the part span inlet guide vane 100 with the high pressure composition airflow 160. As is depicted, each of the plurality of part span inlet guide vanes 100 for the embodiment depicted further defines a trailing edge opening 170, which is in airflow communication with the cavity 168, and thus is in airflow communication with the compensation air supply duct 164 of the compensation air supply assembly 162. Accordingly, with such a configuration, the high pressure composition airflow 160 may be provided from the compensation air supply assembly 162 to the cavity 168 of the part span inlet guide vane 100, and further through the trailing edge opening 170 of the part span inlet guide vane 100 during operation of the turbofan engine 10 to reduce a wake formed by the respective part span inlet guide vane 100.

Although described as a "cavity" 168, in other embodiments the cavity 168 may be configured as any suitable opening or passage within the part span inlet guide vane 100 to allow a flow of air therethrough. Additionally, in other exemplary embodiments, the plurality of part span inlet guide vanes 100 may instead include any other suitable manner of pneumatically reducing the wake of the respective part span inlet guide vanes 100. For example, in other exemplary embodiments, the trailing edge opening 170 of each part span inlet guide vane 100 may instead be configured as, e.g., a plurality of trailing edge of openings spaced, e.g., along a span 106 of the respective part span inlet guide vane 100 at the trailing edge 110.

Figure 9:
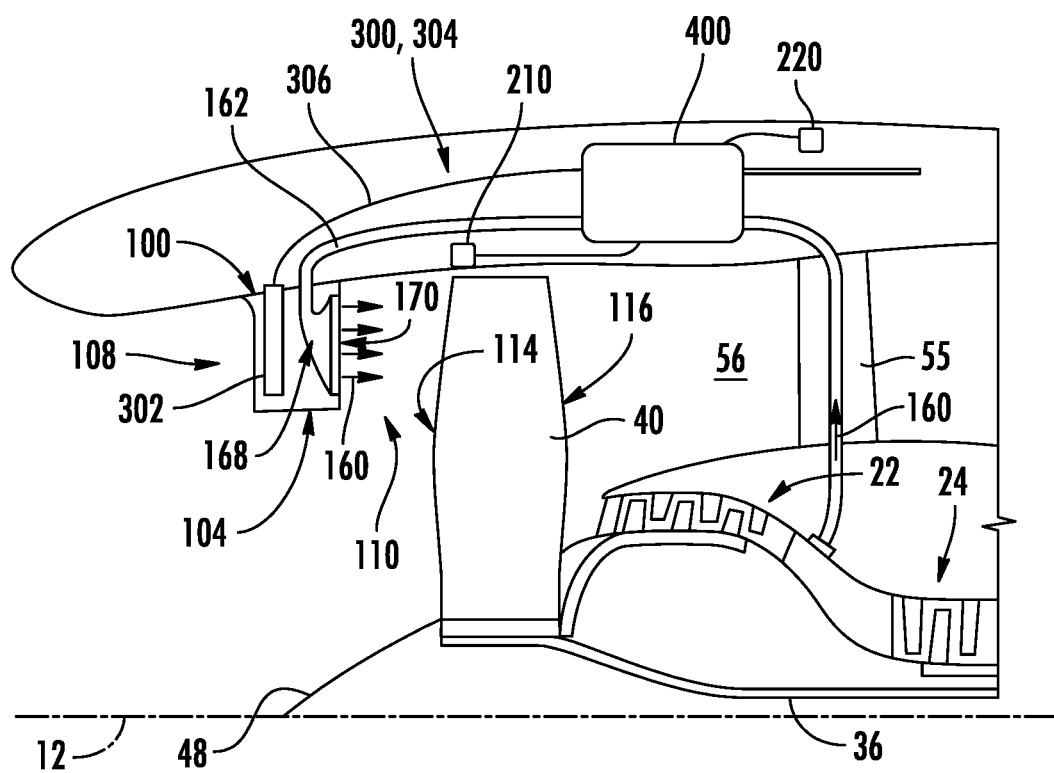
FIG. 9 is a schematic view of an exemplary gas turbine engine according to another exemplary embodiment of the present subject matter.

Referring now also to FIG. 9, in exemplary embodiments, the turbofan engine 10 further includes a blade passing sensor 210 in communication with the fan blades 40, a crosswind sensor 220 in communication with the outer nacelle 50, and an electrical system 300 to reduce ice buildup or ice formation on the part span inlet guide vanes 100 as discussed in detail herein.

In exemplary embodiments, the blade passing sensor 210 that is in communication with the fan blades 40 measures the following information. Although the typical engine control system includes speed sensors, that could indicate the frequency at which the fan blades 40 pass the part span inlet guide vanes 100, it would be advantageous to time the release of a puff of air from the trailing edge 110 of the part span inlet guide vanes 100 to correspond with a specific orientation of the fan blade 40 to the part span inlet guide vane 100. For example, it may be more or less advantageous to deliver a puff of air when the leading edge 114 of the fan blade 40 is axially aligned with the part span inlet guide vane 100 as compared to when the part span inlet guide vane 100 is equidistant between the leading edges 114 of two consecutive fan blades 40. The exact timing for releasing the puff of air could be modulated based on the rotational speed of the fan 38 and the airspeed of the aircraft so as to provide the smoothest incoming airflow to the fan blade 40.

In exemplary embodiments the crosswind sensor 220 that is in communication with the outer nacelle 50 measures conditions of the wind blowing on the outer nacelle 50, e.g., the strength of the wind, the direction of the wind, etc.

In an exemplary embodiment, the turbofan engine 10 also includes an electrical system 300 having electrical heating elements 302, an electrical supply assembly 304, and electrical supply cables 306. In an exemplary embodiment, the electrical heating elements 302 are disposed in thermal communication with the part span inlet guide vanes 100. In exemplary embodiments, the electrical heating element 302 also includes a piezoelectric transducer that vibrates the inlet pre-swirl feature, e.g., the part span inlet guide vane 100.

In an exemplary embodiment, the electrical supply assembly 304 includes electrical supply cables 306 that are in electrical communication with the electrical heating elements 302. In this manner, the electrical supply cables 306 of the electrical system 300 provide power to the electrical heating elements 302 to heat the part span inlet guide vanes 100. The electrical system 300 operates as a means for reducing ice buildup or ice formation at the part span inlet guide vanes 100 of the turbofan engine 10.

Figure 10:
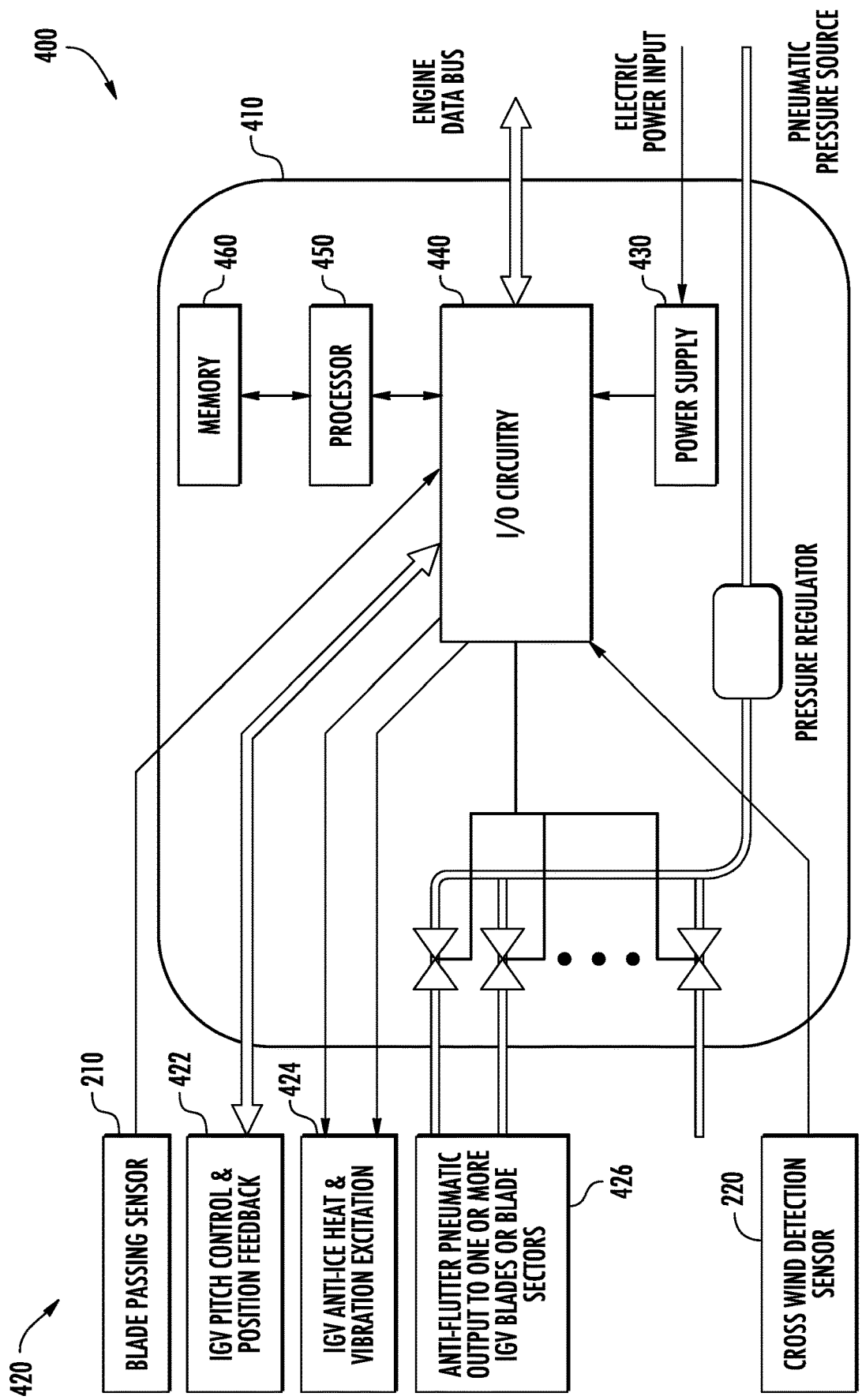
FIG. 10 provides a schematic view of a control system of a gas turbine engine in accordance with exemplary embodiments of the present disclosure.

FIG. 10 provides a block diagram of an exemplary control system 400 for controlling a turbofan engine 10 (FIG. 1) in accordance with exemplary embodiments of the present disclosure.

Referring to FIG. 10, a control system 400 of the present disclosure may be in communication with the variable pitch mechanism 140 (FIG. 7), the compensation air supply assembly 162 (FIG. 8), the blade passing sensor 210 (FIG. 9), the crosswind sensor 220 (FIG. 9), and the electrical system 300 (FIG. 9) of the turbofan engine 10. For example, the control system 400 may be used to determine when to transition or to change an angle (for example, FIGS. 5 and 6) of the inlet pre-swirl feature, e.g., configured as the plurality of part span inlet guide vanes 100, with respect to the longitudinal axis 12 of the outer nacelle 50. Furthermore, the control system 400 may be used to determine when to modulate the high pressure airflow 160 through the trailing edge opening 170 (FIG. 8) of the inlet pre-swirl feature during operation of the turbofan h In some embodiments, all of the components of the control system 400 are onboard the turbofan engine 10. In other embodiments, some of the components of the control system 400 are onboard the turbofan engine 10 and some are offboard the turbofan engine 10. For instance, some of the offboard components can be mounted to a wing, fuselage, or other suitable structure of an aerial vehicle to which the turbofan engine 10 is mounted.

Referring to FIG. 10, the control system 400 includes a controller 410, a sensing unit 420, a power source 430, and an input/output (IO) circuit 440. In an exemplary embodiment, the control system 400 is in communication with the variable pitch mechanism 140 (FIG. 7), the compensation air supply assembly 162 (FIG. 8), the blade passing sensor 210

(FIG. 9), the crosswind sensor 220 (FIG. 9), and the electrical system 300 (FIG. 9) of the turbofan engine 10.

In an exemplary embodiment, the sensing unit 420 may include sensors at the components of the turbofan engine 10, e.g., a blade passing sensor 210 in communication with the fan blades 40, a crosswind sensor 220 in communication with the outer nacelle 50, a pitch control and position feedback sensor 422, an anti-ice system sensor 424, and an anti-flutter sensor 426.

The sensing unit 420 of the control system 400 monitors conditions of the components of the turbofan engine 10. For example, when the sensing unit 420 receives an input indicating a wind condition at the outer nacelle 50 from the crosswind sensor 220 (FIG. 9), the controller 410 transitions or changes an angle (for example, FIGS. 5 and 6) with respect to the longitudinal axis 12 of the outer nacelle 50 of the inlet pre-swirl feature. Furthermore, when the sensing unit 420 receives an input indicating a condition of the fan blades 40 from the blade passing sensor 210 (FIG. 9), the controller 410 modulates the high pressure airflow 160 through the trailing edge opening 170 (FIG. 8) of the inlet pre-swirl feature during operation of the turbofan engine 10. Furthermore, when the sensing unit 420 receives an input indicating a change in a condition of the inlet pre-swirl feature via the anti-ice system sensor 424, the controller 410 causes the electrical supply assembly 304 of the electrical system 300 to provide power to the electrical heating elements 302.

In an exemplary embodiment, the turbofan engine 10 includes a computing system. Particularly, for this embodiment, the turbofan engine 10 includes a computing system having one or more computing devices, including a controller 410 configured to control the turbofan engine 10, and, in this embodiment, the power source 430 and other components of the control system 400 as described herein. The controller 410 can include one or more processor(s) 450 and associated memory device(s) 460 configured to perform a variety of computer-implemented functions and/or instructions (e.g., performing the methods, steps, calculations, and the like, and storing relevant data as disclosed herein). The instructions, when executed by the one or more processors, can cause the one or more processor(s) to perform operations, such as transitioning or changing an angle (for example, FIGS. 5 and 6) with respect to the longitudinal axis 12 of the outer nacelle 50 of the inlet pre-swirl feature; modulating the high pressure airflow 160 through the trailing edge opening 170 (FIG. 8) of the inlet pre-swirl feature during operation of the turbofan engine 10, and/or causing the electrical supply assembly 304 of the electrical system 300 to provide power to the electrical heating elements 302 upon receiving an input indicating a change in condition of one of the components of the turbofan engine 10.

Additionally, the controller 410 can include a communications module to facilitate communications between the controller 410 and various components of the aerial vehicle and other electrical components of the engine 10. The communications module can include a sensor interface (e.g., one or more analog-to-digital converters) to permit signals transmitted from the one or more sensors to be converted into signals that can be understood and processed by the one or more processor(s). The sensors can be communicatively coupled to the communications module using any suitable means. For example, the sensors can be coupled to the sensor interface via a wired connection. However, in other embodiments, the sensors can be coupled to the sensor interface via a wireless connection, such as by using any suitable wireless communications protocol. As such, the processor(s) can be configured to receive one or more signals or outputs from the sensors, such as one or more operating conditions/parameters.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) can generally be configured to store suitable computer-readable instructions that, when implemented by the processor(s), configure the controllers 410 to perform the various functions described herein. The controller 410 can be configured in substantially the same manner as the exemplary computing device of the computing system 500 described below with reference to FIG. 11.

The controller 410 may be a system of controllers or a single controller. The controller 410 may be a controller dedicated to control of the power source 430, the electrical system 300, and associated electrical components or can be an engine controller configured to control the turbofan engine 10 as well as the control system 400, and its associated electrical components. The controller 410 can be, for example, an Electronic Engine Controller (EEC) or an Electronic Control Unit (ECU) of a Full Authority Digital Engine Control (FADEC) system.

The control system 400 can include one or more power management electronics or electrical control devices, such as inverters, converters, rectifiers, devices operable to control the flow of electrical current, etc. For instance, one or more of the control devices can be operable to condition and/or to convert electrical power (e.g., from AC to DC or vice versa). Further, one or more of the control devices can be operable to control the electrical power provided to the electrical system 300 by the power source 430. Although, the control devices may be separate from the power source 430 and the controller 410, one, some, or all of control devices can be located onboard the power source 430 and/or the controller 410.

As discussed, the turbofan engine 10 may also include one or more sensors for sensing and/or monitoring various engine operating conditions and/or parameters during operation. For instance, one or more sensors can be positioned in communication with the fan blades 40, e.g., the blade passing sensor 210, in communication with the outer nacelle 50, e.g., the crosswind sensor 220, and/or in communication with other components of the turbofan engine 10 as described herein. The sensors of the sensing unit 420 can sense or measure various engine conditions, e.g., pressures and temperatures, and one or more signals may be routed from the one or more sensors to the controller 410 for processing. Accordingly, the controller 410 is communicatively coupled with the one or more sensors, e.g., via a suitable wired or wireless communication link. The turbofan engine 10 can include other sensors at other suitable stations along the core air flowpath.

Figure 11:
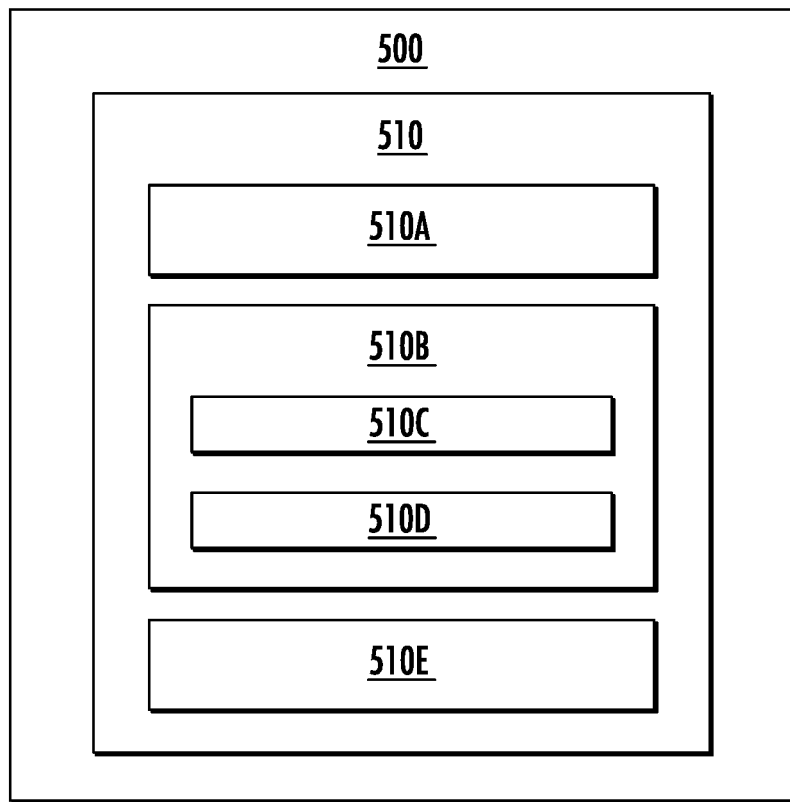
FIG. 11 is an example computing system according to exemplary embodiments of the present disclosure.

FIG. 11 provides an example computing system 500 according to example embodiments of the present disclosure. The computing systems (e.g., the controller 410) described herein may include various components and perform various functions of the computing system 500 described below, for example.

As shown in FIG. 11, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, operations for electrically assisting a turbomachine during transient operation, e.g., any operations or functions of the one or more computing device(s) 510. Accordingly, a method of operating a turbofan engine 10 as described herein may be a computer-implemented method, such that each of the steps of an exemplary method of operating a turbofan engine 10 as described herein are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including, for example, transmitters, receivers, ports, controllers, antennas, and/or other suitable components. One or more external devices, such as electrical control device(s), can be configured to receive one or more commands from the computing device(s) 510 or provide one or more commands to the computing device(s) 510.

A control system 400 of the present disclosure does not require a change to the mechanical hardware of an engine and facilities simple retrofit with existing engines.

Figure 12:
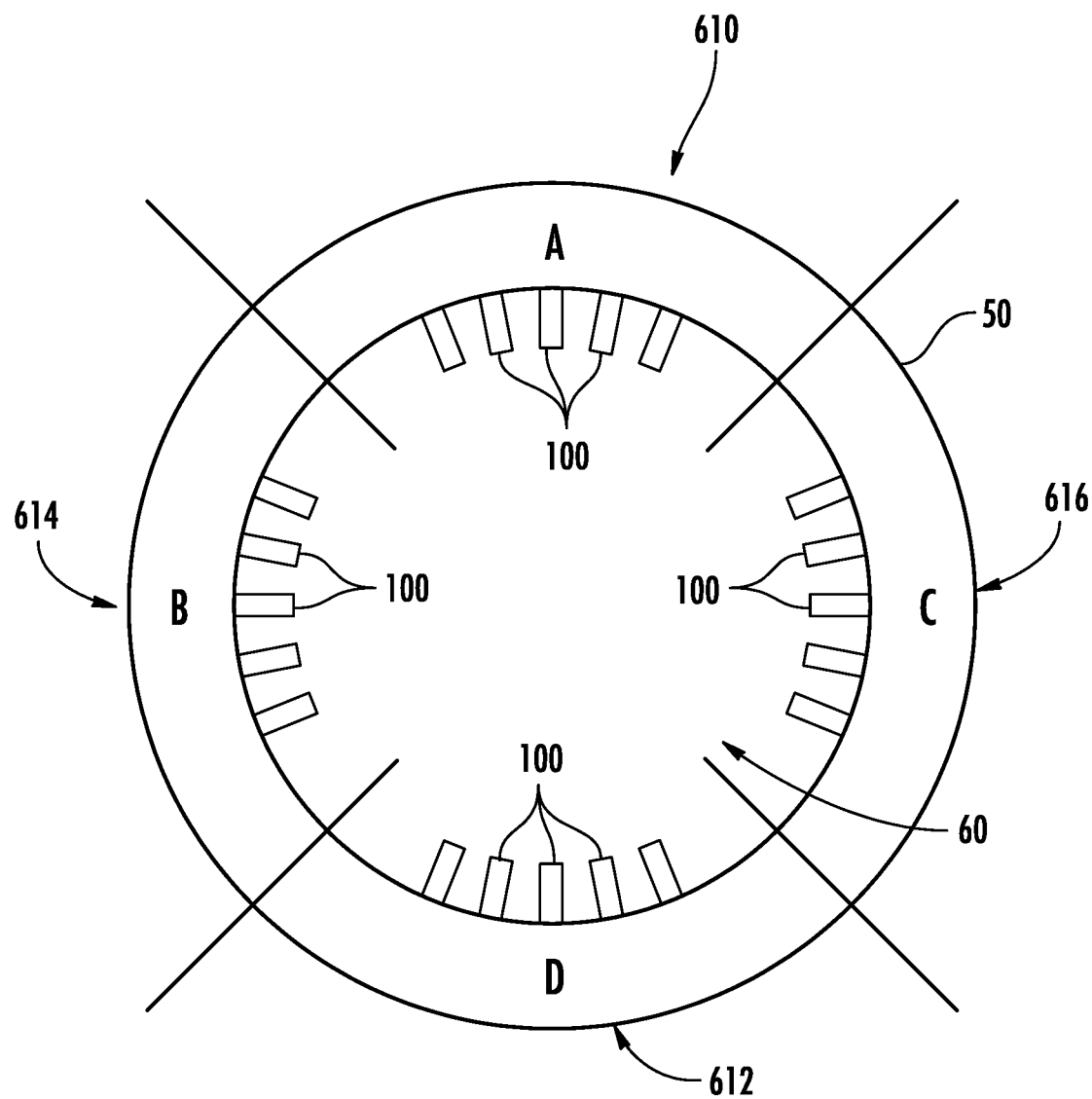
FIG. 12 is a schematic view of an inlet to a gas turbine engine in accordance with another exemplary embodiment of the present disclosure.

Referring now back to FIG. 7 and also to FIG. 12, providing an axial view of the inlet 60 to the turbofan engine 10 of FIGS. 1 and 2, exemplary control systems for transitioning the inlet pre-swirl feature, e.g., configured as the plurality of part span inlet guide vanes 100, between a first angle (for example, FIG. 5) with respect to the longitudinal axis 12 of the outer nacelle 50 and a second angle (for example, FIG. 6) with respect to the longitudinal axis 12 of the outer nacelle 50 will now be described.

In an exemplary embodiment, the outer nacelle 50 includes a top portion 610, a bottom portion 612, a first side portion 614, and a second side portion 616. In such an embodiment, the plurality of part span inlet guide vanes 100 in the top portion 610 are in sector A, the plurality of part span inlet guide vanes 100 in the first side portion 614 are in sector B, the plurality of part span inlet guide vanes 100 in the second side portion 616 are in sector C, and the plurality of part span inlet guide vanes 100 in the bottom portion 612 are in sector D. Furthermore, in such an exemplary embodiment, the transitioning of an angle (for example, FIGS. 5 and 6) with respect to the longitudinal axis 12 of the outer nacelle 50 of the part span inlet guide vanes 100 are separately controlled in each sector A, B, C, and D.

An aircraft engine inlet 60 is exposed to the atmosphere, and to wind conditions that may be from any direction. Furthermore, since the engine 10 is typically shielded on the side that is closer to the fuselage of the aircraft, the wind conditions may be stronger on the side that is away from the aircraft. The aircraft may also be subject to up/downdrafts. As the wind can generally be expected to blow in a singular direction across the face of the engine 10, each of the part span inlet guide vanes 100 is at a different angle with respect to the wind. As such the effect of a cross wind on the incoming air is a function of the angle of the part span inlet guide vane 100 with respect to the cross wind. It is desirable to impart a swirl to the incoming air that accounts for the cross wind velocity at the particular clock position of the individual part span inlet guide vanes 100. As such individualized control of the angle of the part span inlet guide vanes 100 is desirable.

As the complexity of the part span inlet guide vane control system increases the weight of the system increases, which has an effect on the total engine/aircraft efficiency. Therefore, it may be desirable to group the part span inlet guide vanes 100 into clusters to minimize the weight of the total system, while still being able to control the angle of the part span inlet guide vanes 100 of differing sectors of the inlet, such as left and right or top & bottom sectors.

As described above, the sensing unit 420 of the control system 400 (FIG. 10) monitors conditions of the components of the turbofan engine 10. In the sector control exemplary embodiment depicted in FIG. 12, when the sensing unit 420 receives an input indicating a wind condition at the outer nacelle 50 from the crosswind sensor 220 (FIG. 9), the controller 410 transitions or changes an angle (for example, FIGS. 5 and 6) with respect to the longitudinal axis 12 of the outer nacelle 50 of the part span inlet guide vanes 100 in the first side portion 614 and the second side portion 616. Furthermore, when the sensing unit 420 receives an input indicating an angle of attack condition of the turbofan engine 10, the controller 410 transitions or changes an angle (for example, FIGS. 5 and 6) with respect to the longitudinal axis 12 of the outer nacelle 50 of the part span inlet guide vanes 100 in the top portion 610 and the bottom portion 612.

In other exemplary embodiment, the transitioning of an angle (for example, FIGS. 5 and 6) with respect to the longitudinal axis 12 of the outer nacelle 50 of each of the part span inlet guide vanes 100 is each independently controlled.

The turbomachines and methods of the present disclosure may be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the turbomachines and methods of the present disclosure may be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the disclosure are provided by the subject matter of the following clauses:

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan, the nacelle defining a longitudinal axis; and an inlet pre-swirl feature located upstream of the plurality of fan blades, the inlet pre-swirl feature attached to or integrated into the nacelle, wherein the inlet pre-swirl feature is transitionable between a first angle with respect to the longitudinal axis of the nacelle and a second angle with respect to the longitudinal axis of the nacelle.

The turbofan engine of any preceding clause, further comprising a variable pitch mechanism in communication with the inlet pre-swirl feature, wherein the variable pitch mechanism is configured to transition the inlet pre-swirl feature between the first angle with respect to the longitudinal axis of the nacelle and the second angle with respect to the longitudinal axis of the nacelle.

The turbofan engine of any preceding clause, further comprising a compensation air supply assembly in airflow communication with a high pressure air source of the turbofan engine, wherein the inlet pre-swirl feature includes a leading edge, a trailing edge, and defines an opening at the trailing edge, wherein the compensation air supply assembly is in airflow communication with the opening at the trailing edge of the inlet pre-swirl feature, and wherein the compensation air supply assembly is configured to provide a high pressure airflow through the opening at the trailing edge of the inlet pre-swirl feature during operation of the turbofan engine to reduce a wake formed by the inlet pre-swirl feature.

The turbofan engine of any preceding clause, further comprising a blade passing sensor in communication with the fan blades.

The turbofan engine of any preceding clause, further comprising a controller having one or more processors and one or more memory devices, the one or more memory devices storing instructions that when executed by the one or more processors cause the one or more processors to perform operations, in performing the operations, the one or more processors are configured to: receive an input indicating a condition of the fan blades from the blade passing sensor; and in response to the condition of the fan blades, modulate the high pressure airflow through the opening at the trailing edge of the inlet pre-swirl feature during operation of the turbofan engine.

The turbofan engine of any preceding clause, further comprising a crosswind sensor in communication with the nacelle.

The turbofan engine of any preceding clause, wherein the one or more processors are further configured to: receive an input indicating a wind condition at the nacelle from the crosswind sensor; and in response to the wind condition, move the inlet pre-swirl feature by changing the first angle or the second angle with respect to the longitudinal axis of the nacelle of the inlet pre-swirl feature.

The turbofan engine of any preceding clause, further comprising an electrical heating element disposed in thermal communication with the inlet pre-swirl feature.

The turbofan engine of any preceding clause, further comprising an electrical supply assembly comprising an electrical supply cable in electrical communication with the electrical heating element.

The turbofan engine of any preceding clause, wherein the one or more processors are further configured to: receive an input indicating a change in a condition of the inlet pre-swirl feature; and in response to the change in the condition of the inlet pre-swirl feature, cause the electrical supply assembly to provide power to the electrical heating element.

The turbofan engine of any preceding clause, wherein the electrical heating element includes a piezoelectric transducer that vibrates the inlet pre-swirl feature.

The turbofan engine of any preceding clause, wherein the first angle and the second angle are each between approximately 5 degrees and approximately 35 degrees, and wherein the first angle and the second angle are different.

The turbofan engine of any preceding clause, wherein the inlet pre-swirl feature comprises a plurality of part span inlet guide vanes extending from the nacelle upstream of the plurality of fan blades and aft of an inlet of the nacelle.

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan, the nacelle defining a longitudinal axis; a first inlet pre-swirl feature located upstream of the plurality of fan blades, the first inlet pre-swirl feature attached to or integrated into the nacelle; and a second inlet pre-swirl feature located upstream of the plurality of fan blades, the second inlet pre-swirl feature attached to or integrated into the nacelle, wherein the first inlet pre-swirl feature is transitionable between a first angle with respect to the longitudinal axis of the nacelle and a second angle with respect to the longitudinal axis of the nacelle, wherein the second inlet pre-swirl feature is transitionable between a third angle with respect to the longitudinal axis of the nacelle and a fourth angle with respect to the longitudinal axis of the nacelle, and wherein the first inlet pre-swirl feature and the second inlet pre-swirl feature are independently controlled.

The turbofan engine of any preceding clause, further comprising a variable pitch mechanism in communication with the first inlet pre-swirl feature and the second inlet pre-swirl feature, wherein the variable pitch mechanism is configured to transition the first inlet pre-swirl feature between the first angle with respect to the longitudinal axis of the nacelle and the second angle with respect to the longitudinal axis of the nacelle, and wherein the variable pitch mechanism is configured to transition the second inlet pre-swirl feature between the third angle with respect to the longitudinal axis of the nacelle and the fourth angle with respect to the longitudinal axis of the nacelle.

The turbofan engine of any preceding clause, wherein the first inlet pre-swirl feature and the second inlet pre-swirl feature each comprises a plurality of part span inlet guide vanes extending from the nacelle upstream of the plurality of fan blades and aft of an inlet of the nacelle.

The turbofan engine of any preceding clause, wherein the variable pitch mechanism is configured to simultaneously transition the first inlet pre-swirl feature between the first angle with respect to the longitudinal axis of the nacelle and the second angle with respect to the longitudinal axis of the nacelle and the second inlet pre-swirl feature between the third angle with respect to the longitudinal axis of the nacelle and the fourth angle with respect to the longitudinal axis of the nacelle.

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan, the nacelle including a top portion, a bottom portion, a first side portion, a second side portion, and defining a longitudinal axis; and a plurality of inlet pre-swirl features located upstream of the plurality of fan blades, the inlet pre-swirl features attached to or integrated into the nacelle, wherein the inlet pre-swirl features are transitionable between a first angle with respect to the longitudinal axis of the nacelle and a second angle with respect to the longitudinal axis of the nacelle, and wherein the inlet pre-swirl features in the top portion, the inlet pre-swirl features in the bottom portion, the inlet pre-swirl features in the first side portion, and the inlet pre-swirl features in the second side portion are each separately controlled.

The turbofan engine of any preceding clause, further comprising a crosswind sensor in communication with the nacelle.

The turbofan engine of any preceding clause, further comprising a controller having one or more processors and one or more memory devices, the one or more memory devices storing instructions that when executed by the one or more processors cause the one or more processors to perform operations, in performing the operations, the one or more processors are configured to: receive an input indicating a wind condition at the nacelle from the crosswind sensor; and in response to the wind condition, move the inlet pre-swirl features by changing the first angle or the second angle with respect to the longitudinal axis of the nacelle of the inlet pre-swirl features in the first side portion and the inlet pre-swirl features in the second side portion.

The turbofan engine of any preceding clause, wherein the one or more processors are further configured to: receive an input indicating an angle of attack condition of the turbofan engine; and in response to the angle of attack condition, move the inlet pre-swirl features by changing the first angle or the second angle with respect to the longitudinal axis of the nacelle of the inlet pre-swirl features in the top portion and the inlet pre-swirl features in the bottom portion.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and that fall within the limits of the appended claims.

What is claimed is:

1. A turbofan engine comprising:
   a fan comprising a plurality of fan blades;
   a turbomachine operably coupled to the fan for driving the fan, the turbomachine comprising a compressor section, a combustion section, and a turbine section in serial flow order and together defining a core air flowpath;
   a nacelle surrounding and at least partially enclosing the fan, the nacelle defining a longitudinal axis;
   an inlet pre-swirl feature located upstream of the plurality of fan blades, the inlet pre-swirl feature attached to or integrated into the nacelle, wherein the inlet pre-swirl feature is transitionable between a first angle with respect to the longitudinal axis of the nacelle and a second angle with respect to the longitudinal axis of the nacelle;
   an anti-ice system operable with the inlet pre-swirl feature, wherein the anti-ice system includes an electrical heating element in thermal communication with the inlet pre-swirl feature and an electrical supply assembly having electrical supply cables configured to power the electrical heating element; and
   a controller having one or more processors and one or more memory devices, the one or more memory devices storing instructions that when executed by the one or more processors cause the one or more processors to perform operations, in performing the operations, the one or more processors are configured to:
   receive an input indicating a change in a condition of the inlet pre-swirl feature; and
   in response to the change in the condition of the inlet pre-swirl feature, cause the electrical supply assembly to provide power to the electrical heating element.

2. The turbofan engine of claim 1, wherein the anti-ice system includes an electrical heating element in thermal communication with the inlet pre-swirl feature.

3. The turbofan engine of claim 2, wherein the anti-ice system further includes an electrical supply assembly having electrical supply cables configured to power the electrical heating element.

4. The turbofan engine of claim 2, wherein the electrical heating element also includes a piezoelectric transducer that vibrates the inlet pre-swirl feature.

5. The turbofan engine of claim 1, further comprising:
   a variable pitch mechanism in communication with the inlet pre-swirl feature to transition the inlet pre-swirl feature from the first angle to the second angle.

6. The turbofan engine of claim 1, further comprising:
a sensing unit; and
a control system in communication with the sensing unit, the control system including the controller.

7. The turbofan engine of claim 6, wherein the sensing unit includes a blade passing sensor, a crosswind sensor in communication with the nacelle, a pitch control and position feedback sensor, an anti-ice system sensor, an anti-flutter sensor, or a combination thereof.

8. The turbofan engine of claim 6, wherein the sensing unit includes a crosswind sensor in communication with the nacelle and an anti-ice system sensor.

9. A turbofan engine comprising:
a fan comprising a plurality of fan blades;
a turbomachine operably coupled to the fan for driving the fan, the turbomachine comprising a compressor section, a combustion section, and a turbine section in serial flow order and together defining a core air flowpath;
a nacelle surrounding and at least partially enclosing the fan, the nacelle defining a longitudinal axis;
an inlet pre-swirl feature located upstream of the plurality of fan blades, the inlet pre-swirl feature attached to or integrated into the nacelle;
an anti-ice system operable with the inlet pre-swirl feature; and
a controller having one or more processors and one or more memory devices, the one or more memory devices storing instructions that when executed by the one or more processors cause the one or more processors to perform operations, in performing the operations, the one or more processors are configured to:
receive an input indicating a change in a condition of the inlet pre-swirl feature; and
in response to the change in the condition of the inlet pre-swirl feature, activate the anti-ice system.

10. The turbofan engine of claim 9, wherein the anti-ice system comprises an electrical heating element in thermal communication with the inlet pre-swirl feature and an electrical supply assembly having electrical supply cables configured to power the electrical heating element.

11. The turbofan engine of claim 10, Wherein in activating the anti-ice system, the one or more processors are configured to cause the electrical supply assembly to provide power to the electrical heating element.

12. The turbofan engine of claim 9, further comprising:
a sensing unit; and
a control system in communication with the sensing unit, the control system including the controller.

13. The turbofan engine of claim 12, wherein the sensing unit includes a blade passing sensor, a crosswind sensor in communication with the nacelle, a pitch control and position feedback sensor, an anti-ice system sensor, an anti-flutter sensor, or a combination thereof.

14. The turbofan engine of claim 12, wherein the sensing unit includes a crosswind sensor in communication with the nacelle and an anti-ice system sensor.

15. The turbofan engine of claim 9, wherein the anti-ice system includes an electrical heating element in thermal communication with the inlet pre-swirl feature, and wherein the electrical heating element includes a piezoelectric transducer that vibrates the inlet pre-swirl feature.

16. The turbofan engine of claim 9, wherein the inlet pre-swirl feature is transitionable between a first angle with respect to the longitudinal axis of the nacelle and a second angle with respect to the longitudinal axis of the nacelle.

17. The turbofan engine of claim 16, further comprising:
a variable pitch mechanism in communication with the inlet pre-swirl feature to transition the inlet pre-swirl feature from the first angle to the second angle.

18. The turbofan engine of claim 9, further comprising:
a compensation air supply assembly in airflow communication with a high pressure air source of the turbofan engine, wherein the inlet pre-swirl feature includes a part span inlet guide vane defining a cavity in airflow communication with the compensation air supply assembly and an opening to provide a compensation airflow received in the cavity therethrough.

19. A turbofan engine comprising:
a fan comprising a plurality of fan blades;
a turbomachine operably coupled to the fan for driving the fan, the turbomachine comprising a compressor section, a combustion section, and a turbine section in serial flow order and together defining a core air flowpath;
a nacelle surrounding and at least partially enclosing the fan, the nacelle defining a longitudinal axis;
an inlet pre-swirl feature located upstream of the plurality of fan blades, the inlet pre-swirl feature attached to or integrated into the nacelle, wherein the inlet pre-swirl feature is transitionable between a first angle with respect to the longitudinal axis of the nacelle and a second angle with respect to the longitudinal axis of the nacelle; and
an anti-ice system operable with the inlet pre-swirl feature;
a compensation air supply assembly in airflow communication with a high pressure air source of the turbofan engine, wherein the inlet pre-swirl feature includes a part span inlet guide vane defining a cavity in airflow communication with the compensation air supply assembly and an opening to provide a compensation airflow received in the cavity therethrough.

* * * * *